United States Patent [19]
Motley et al.

[11] 3,979,685
[45] Sept. 7, 1976

[54] FREQUENCY SHIFT KEY DEMODULATOR

[75] Inventors: David M. Motley, Santa Ana; King Y. Cheng, Tustin; Richard W. Middlestead, El Toro, all of Calif.

[73] Assignee: Hycom Incorporated, Irvine, Calif.

[22] Filed: Sept. 16, 1974

[21] Appl. No.: 506,209

[52] U.S. Cl. ............................ 329/105; 325/320; 325/325; 329/126
[51] Int. Cl.². .................. H03D 3/00; H04L 27/14
[58] Field of Search .......... 329/104, 105, 106, 107, 329/110, 126; 328/140, 141; 325/320, 325; 178/66 A, 88

[56] References Cited
UNITED STATES PATENTS
| | | | |
|---|---|---|---|
| 3,522,539 | 8/1970 | Levine et al. | 329/126 X |
| 3,656,064 | 4/1972 | Giles et al. | 329/104 |

*Primary Examiner*—Siegfried H. Grimm
*Attorney, Agent, or Firm*—Gordon L. Peterson

[57] ABSTRACT

A demodulator for detecting first and second frequencies in an analog input signal includes a limiter providing first pulses having a short duration in response to the first frequency and having a long duration in response to the second frequency. A first counter provides a first reference signal including second pulses, and a second counter provides a second reference signal including third pulses. Logic means responsive to the second and third pulses provide a signal including fourth pulses during periods corresponding to the first frequency and a signal including fifth pulses during periods corresponding to the second frequency. An up-down counter is responsive to the fourth pulses to provide a first output signal and responsive to the fifth pulses to provide a second output signal. The fourth and fifth pulses have frequencies and durations providing the counter with substantially equal counting rates during the periods corresponding to the first and second frequencies of the analog signal.

16 Claims, 6 Drawing Figures

FREQUENCY SHIFT KEY DEMODULATOR

BACKGROUND OF THE INVENTION

1. Field of the Invention

The present invention relates to Frequency Shift Key (FSK) Demodulators and more specifically to those FSK demodulators applicable to MOS-LSI design which are capable of near theoretical performance.

2. Description of the Prior Art

Frequency Shift Keying is a form of frequency modulation in which the modulating wave shifts the carrier frequency back and forth between first and second distinct frequencies to designate either a MARK or a SPACE. These characteristics make this form of frequency modulation particularly adaptable to digital binary systems wherein a MARK represents a digital ONE and a SPACE designates a digital ZERO. The present invention relates to FSK demodulators for detecting the first and second frequencies in the output signal.

The present FSK detection technology includes analog circuitry wherein the FSK analog signal is introduced to a discriminator wherein the frequency of the FSK signal is compared against a standard frequency. Deviations from the standard frequency are converted into amplitude variations. The standard frequency is typically the average of the first and second FSK frequencies so that the amplitude variations are positive for the first FSK frequency and negative for the second FSK frequency.

In another type of analog FSK demodulator, the FSK signal is simultaneously introduced to a pair of circuits which are respectively tuned to the first and second FSK frequencies. The signals at the output of these tuned circuits are introduced to respective envelope detectors which provide output signals having relative magnitudes dependent upon the first or second FSK frequencies in the FSK signal.

Both of these FSK detection techniques involve analog circuitry. Neither of these systems is directly adaptable to the metal-oxide-semiconductor-large-scale integration technology since elaborate and costly digital processing circuitry would be desirable in order to obtain comparable performance.

Existing digital techniques which are applicable to MOS-LSI design perform poorly relative to that which is theoretically obtainable.

SUMMARY OF THE INVENTION

The FSK demodulator of the present invention includes digital binary circuitry which is applicable to MOS-LSI design. Additionally, the concept is applicable to both synchronous and nonsynchronous FSK data and data rates even higher than 150 Hertz. Furthermore, this FSK demodulator can be inexpensively implemented with two-level amplitude quantization of the input signal and the use of an up-down counter to perform digital integration. This combination yields near theoretical performance without elaborate and costly digital processing and filtering techniques.

In accordance with the various embodiments of the invention, digital reference signals are derived from the characteristics of the input FSK signal. These reference signals also have characteristics which are dependent upon a standard frequency. Particular combinations of the digital reference signals provide digital directional signals which independently cause a counter to count either up or down. Counts of the counter beyond a threshold level are detected as either the first or second FSK frequency in the input FSK signal.

The digital reference signals include a plurality of pulses the duration of which can be controlled to insure that the counter counts up at the same rate that it counts down.

These and other features and advantages of the present invention will become more apparent with a description of preferred embodiments in conjunction with the associated drawings.

DESCRIPTION OF PREFERRED EMBODIMENTS

Figure 1:
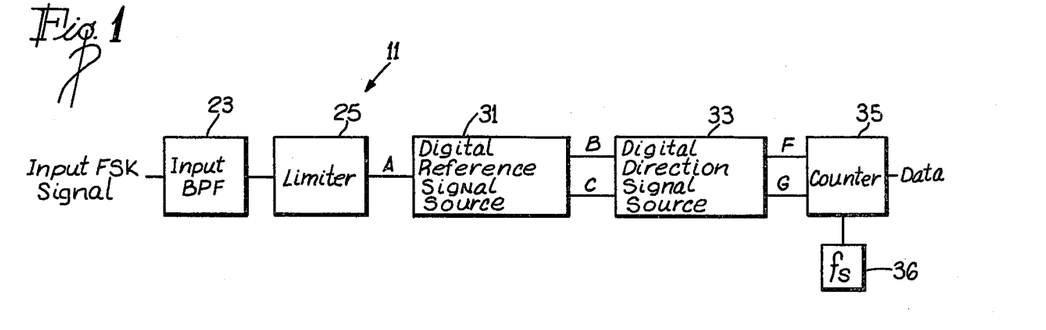
FIG. 1 is a block diagram of the FSK demodulator of the present invention.

A Frequency Shift Key (FSK) demodulator of the present invention is shown in block diagram form in FIG. 1 and designated by the reference numeral 11. The signal introduced to the demodulator 11 is an FSK signal characterized by a first FSK frequency $f_1$ and a second FSK frequency $f_2$. Such a signal is illustrated in FIG. 3 to include a plurality of positive and negative peaks which are separated by positive-going zero crossings 15 and negative-going zero crossings 17.

Figure 3:
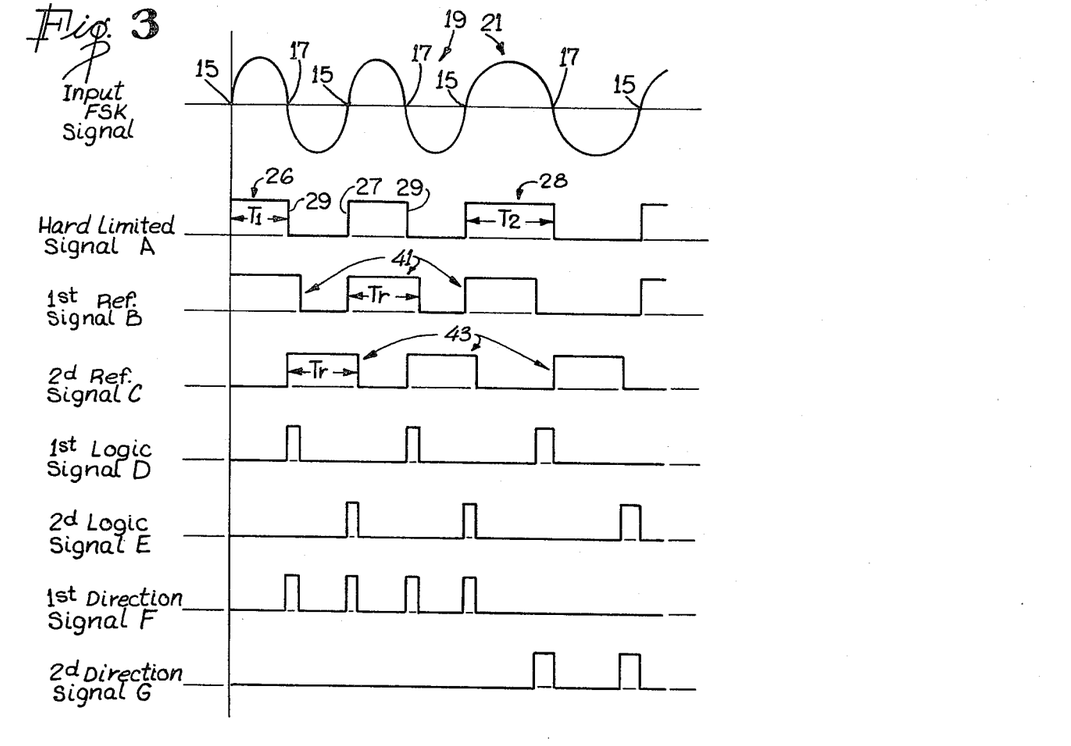
FIG. 3 illustrates the waveforms of various signals which occur at associated positions in the embodiment of FIG. 2.

The waveform of FIG. 3 includes a first portion 19 and a second portion 21. In the first portion 19, the zero crossings 15 and 17 are more closely spaced than in the second portion 21. Therefore, the first portion 19 of the waveform is illustrative of the higher FSK frequency $f_1$ and the second portion 21 is illustrative of the lower FSK frequency $f_2$.

An FSK signal such as that illustrated in FIG. 3 is introduced to a bandpass filter 23 in the demodulator 11 which optimizes the signal-to-noise ratio of the FSK signal. This signal is then introduced to a limiter 25 which provides a hard-limited signal A such as that shown in FIG. 3. This hard-limited signal is defined by relatively narrow pulses 26 associated with the portion 19 and having a duration $T_1$ and relatively wide pulses 28 associated with the portion 21 and having a duration $T_2$. Each of the pulses 26, 28 is characterized by a leading edge 27 occurring in response to the positive-going zero crossings 15, and a trailing edge 29 occurring in response to the negative-going zero crossing 17 of the FSK signal.

The hard-limited signal A is introduced to a digital reference signal source 31. This reference signal source 31 provides first and second reference signals, hereinafter referred to by the reference letters B and C respectively. Each of the reference signals B and C has characteristics dependent upon the characteristics of the pulses in the hard-limited signal A. These characteristics may differ in specific embodiments of the demodulator 11.

The reference signals B and C are introduced to a digital direction signal source 33. This direction signal source 33 combines the reference signals B and C in a particular manner which may also differ in specific embodiments of the invention. However, at its output, the direction signal source 33 provides first and second direction signals hereinafter referred to by the reference letters F and G respectively. The first direction signal F has digital characteristics which theoretically occur only when the first frequency $f_1$ is present in the input FSK signal A. Similarly, the second direction signal G has digital characteristics which theoretically occur only when the second FSK frequency $f_2$ occurs in the input FSK signal.

These two direction signals F and G can be introduced to an up-down counter 35 which is typically driven by a clock 36 providing impulses at a sampling frequency of $f_s$. The counter 35 is responsive to the signal F to count above a particular threshold level to detect the first frequency $f_1$, and is responsive to the signal G to count below the particular threshold level to detect the second frequency $f_2$. At the output of the counter 35, the detection of the first frequency $f_1$ is characterized by a MARK, while the detection of the second frequency $f_2$ is characterized by a SPACE.

The reference signal source 31 is responsive to the leading edge 27 of each of the pulses 26, 28 in the hard-limited signal A to initiate one of a plurality of pulses 41 in the reference signal B.

The reference signal source 31 is also responsive to the trailing edge 29 of each of the pulses 26, 28 in the hard-limited signal A to initiate one of a plurality of pulses 43 in the reference signal C. The signals A, B, and C are illustrated in FIG. 3 for this specific embodiment.

The functions of the first reference signal source 31 can be implemented with various apparatus well-known to persons of ordinary skill in the art. For example in a particular embodiment, the reference signal source 31 can include a digital "one-shot" responsive to the leading edge 27 of the pulses 26, 28 to provide one of the pulses 41. Similarly the reference signal source 31 can include another digital "one-shot" responsive to the trailing edge 29 of the pulses 26,28 to provide one of the pulses 43.

In this embodiment, the pulses 41 and 43 in the reference signals B and C respectively each have a duration $T_r$ which is preferably longer than the duration of the short pulses 26 and shorter than the duration of the long pulses 28 in the hard-limited signal A. The pulses 41 and 43 with these characteristics will overlap in time during periods corresponding to the high FSK frequency $f_1$ and will not overlap in time during periods corresponding to the low FSK frequency $f_2$ in the input FSK signal.

Figure 2:
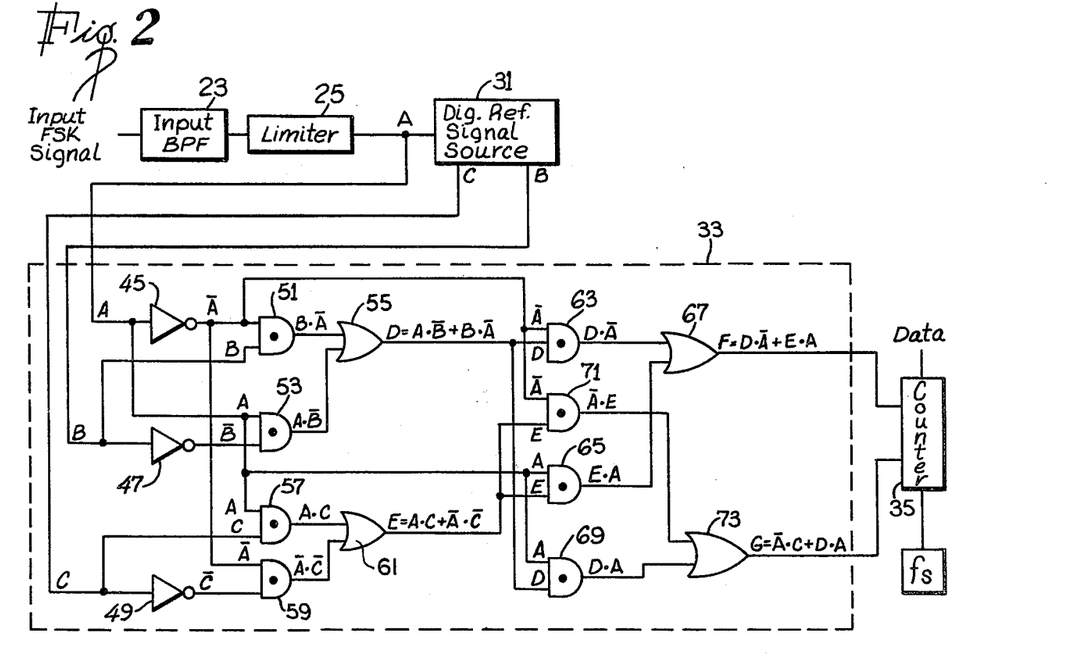
FIG. 2 is a block diagram of a specific embodiment of the demodulator illustrated in FIG. 1.

First and second logic signals reflecting these characteristics can be derived by the logic illustrated in FIG. 2. Thus, the signals A, B and C can be introduced to respective inverters 45, 47 and 49. The output of the inverters 45, 47 and 49 provide the logic signals NOT A or $\overline{A}$, NOT B or $\overline{B}$, and NOT C or $\overline{C}$. The signals B and $\overline{A}$ can be combined in an AND gate 51 to provide the logic signal B.$\overline{A}$. Similarly, the signals A and $\overline{B}$ can be combined in an AND gate 53 to provide the logic signal A.$\overline{B}$. Then the logic signals from the AND gates 51 and 53 can be introduced to an OR gate 55 to provide a first logic signal D equal to A.$\overline{B}$ + B.$\overline{A}$.

In a similar manner, the signals A and C can be combined in and AND gate 57 to provide the logic signal A.C, and the $\overline{A}$ and $\overline{C}$ signals can be combined in an AND gate 59 to provide the logic signal $\overline{A.C}$. These two logic signals can be introduced to an OR gate 61 to provide a second logic signal E equal to A.C. + $\overline{A.C}$.

The logic signals D and E are illustrated in FIG. 3. It will be noted that the quantity A.$\overline{B}$ and the quantity B.$\overline{A}$ each produce pulses in the first logic signal D. Similarly, the quantity A.C and the quantity $\overline{A.C}$ each produces pulses in the second logic signal E. It will also be noted that the B.$\overline{A}$ pulses in the logic signal D and the A.C pulses in the logic signal E correspond to the overlapping of the pulses 41 and 43 in the reference signals B and C respectively. Similarly, the A.$\overline{B}$ pulses in the logic signal D and the $\overline{A.C}$ pulses in the logic signal E correspond to the time periods during which the pulses 41 and 43 do not overlap.

In this particular embodiment of the invention, it is desirable that the first direction signal F include pulses which occur only when the pulses 41 and 43 overlap. Similarly, it is desirable that the second direction signal G include pulses only when the pulses 41 and 43 do not overlap. The first direction signal F of this type can be derived by introducing the signals D amd $\overline{A}$ to AND gate 63, and the signals E and A to an AND gate 65. The outputs of these gates 63 and 65 can be introduced to an OR gate 67 to provide the first direction signal F with characteristics equal to D.$\overline{A}$. + E.A. With reference to FIG. 3, it will be noted that this signal F includes pulses which occur only during those periods of time when the pulses 41 and 43 overlap. More importantly, the pulses in the signal F occur only during times corresponding to the high frequency portion 19 of the FSK signal.

The second direction signal G can be derived in a similar manner by introducing signals A and D to an AND gate 69 and the signals E and $\overline{A}$ to an AND gate 71. The outputs of these gates 69 and 71 can be combined in an OR gate 73, which provides the second direction signal G with characteristics equal to D.A + E.$\overline{A}$. The second direction signal G is illustrated in FIG. 3 where it will be noted that its pulses occur only during periods of time corresponding to the low frequency portion 71 of the FSK signal.

It follows that the signals F and G exist only during the data periods corresponding to $f_1$ (MARK signal frequency) and $f_2$ (SPACE signal frequency) respectively. These characteristics make the signals F and G particularly desirable for use in controlling the up-down counter 35. Thus the direction signal F can be used to enable the counter 35 to count up during those intervals in which pulses occur in the F signal and the signal G can be used to enable the counter 35 to count down during those intervals in which pulses occur in the G signal. The data can be recovered from the up-down counter 35 as Data = "1" (MARK) if counter is $\geq$ NT
Data = "0" (SPACE) if counter is < NT where NT is a threshold which is preferably set halfway between the lowest and the highest count permitted by the counter 35.

It is desirable that the counting of the counter 35 occurs at the same rate for both the F and G signals. It will be noted however that the pulses in the F signal are more closely spaced than those in the G signal so that the mere counting of pulses does not automatically produce this desired result. Therefore it is desirable that the pulses in the F signal have a shorter duration than the pulses in the G signal.

In this embodiment of the invention, the duration of the pulses in the F and G signals is related to he duration $T_r$ of the pulses 41 and 43 in the reference signals B and C. The duration $T_r$ can be defined in terms of a corresponding standard or reference frequency $f_r$ as follows:

$$T_r = \frac{1}{2f_r}$$

Then if $T_1 = \frac{1}{2}f_1$ and $T_2 = \frac{1}{2}f_2$, $T_2 < T_r < T_1$.

If the frequency of the clock 36 driving the counter 35 is designated $f_s$, the maximum count provided to the counter during any one pulse of the signals F or G under ideal conditions is:

$$N_i = \text{INT}\left[\frac{f_s}{2}\left(\frac{f_r - f_i}{f_r f_i}\right)\right]$$

where
"INT" signifies the integer part of the argument, $f_s$ is the clock frequency; and the subscript ($i$) represents the count corresponding to the first or second FSK frequency.

The total number of counts during a particular MARK or SPACE data period (T) is therefore:

$$N_i' = N_i \cdot \text{INT}[2f_i T]$$

By solving the relation $N_1' = N_2'$, it can be shown the detection will provide equal counts for both the signals F and G. Thus it can be shown that the reference frequency $f_r$ is equal to the arithmetic mean of the first and second FSK frequencies $f_1$ and $f_2$ respectively:

$$f_r = \frac{f_1 + f_2}{2}$$

and $$T_r = \frac{1}{f_1 + f_2}$$

It will be apparent to those skilled in the art that this reference period $T_r$ can be generated by a digital counter (not shown) in the reference signal source 31. Such a counter could have a clock rate $f_s$ and a counter length equal to:

$$N_r = \frac{f_s}{2f_r}$$

Figure 4:
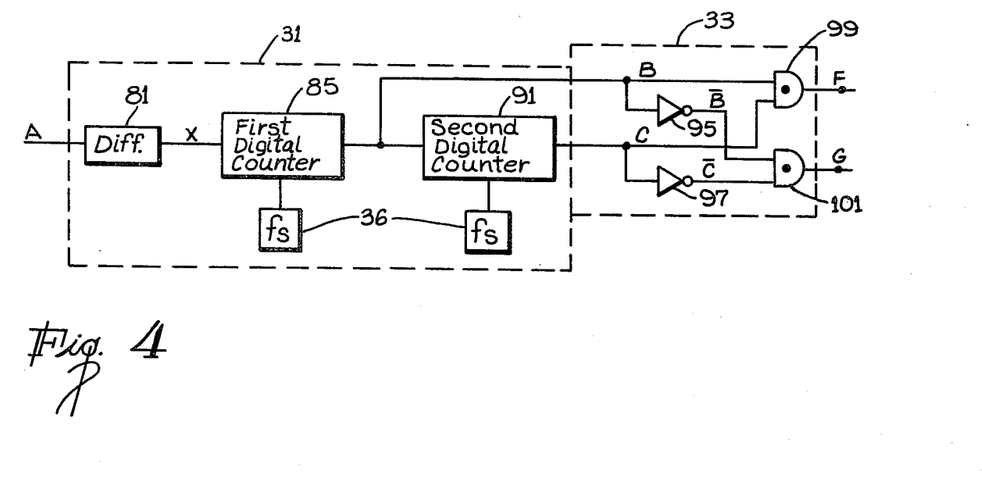
FIG. 4 is a block diagram of a further embodiment of the demodulator illustrated in FIG. 1.

The reference signal source 31 and the direction signal source 33 of a further embodiment of the invention are illustrated in FIG. 4. In this embodiment a differentiator 81 provides a signal X having a pulse 83 corresponding in time to each of the leading edges 27 and trailing edges 29 of the pulses 26,28 in the hard-limited signal A. Of course the pulses 83 in the signal X are more closely spaced in response to the edges 27,29 of the pulses 26 than in response to the edges 27,29 of the pulses 28.

Figure 5:
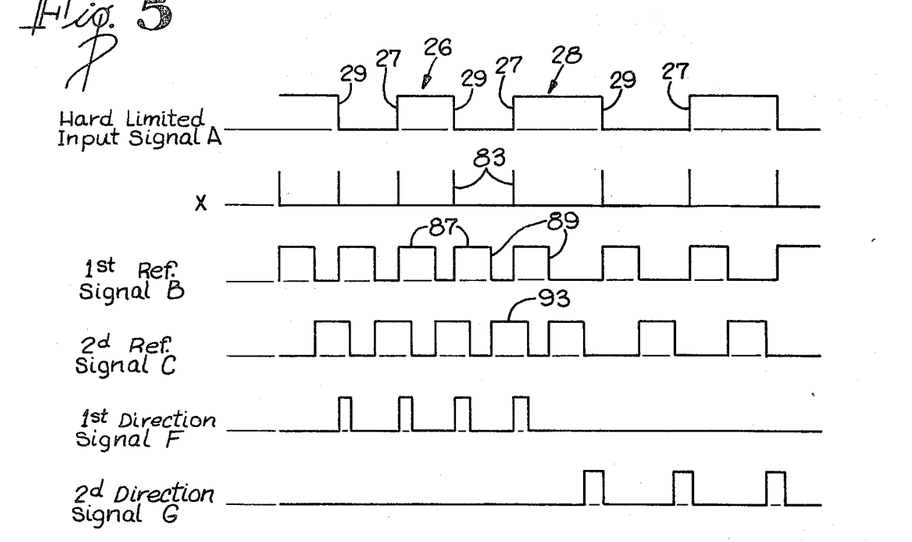
FIG. 5 illustrates the waveforms of various signals which occur at associated positions in the embodiment of FIG. 4.

The signal X is introduced to a first digital counter 85 which is driven by the clock 36 and which initiates each of a plurality of pulses 87 in response to each of the pulses 83. Each of the pulses 87 is automatically terminated after a particular number of counts to define a trailing edge 89 of the pulses 87. This particular number will be discussed in greater detail below. The signal at the output of the first digital counter 85 is the reference signal B discussed with reference to FIG. 1. It will be noted however that this reference signal B, which is illustrated in FIG. 5 differs from that shown in FIG. 3, since in the present embodiment one of the pulses 87 begins on each of the leading edges 27 and trailing edges 29 of the pulses 26,28 in signal A.

A second digital counter 91 initiates each of a plurality of pulses 93 in response to the trailing edge 89 of each of the pulses 87 in the signal B. These pulses 93 define the reference signal C discussed with reference to FIG. 1. This reference signal C, which is shown in FIG. 5, is also different than that illustrated in FIG. 3. Each of the pulses 43 in the signal C illustrated in FIG. 3 begins in response to the trailing edge 29 of the pulses 26,28 in the signal A. In contrast, each of the pulses 93 in the signal C, illustrated in FIG. 5, begins in response to the trailing edge 89 of the reference signal B. The pulses 93 also have a duration corresponding to a particular number of the counts provided by the clock 36.

Specific circuitry for the first and second digital counter 85 and 91 respectively can be of various types which will be apparent to those of ordinary skill in the art. For example, a particular embodiment may include various flip-flops, inverters, logic gates, and an MOS-LSI chip marketed by many manufacturers, such as Texas Instruments, under the Catalog Number 74163.

The relative position of the pulses 87 and 93 is such that they overlap in time during periods corresponding to the narrow pulses 26 in the signal A and do not overlap during periods corresponding to the relatively wide pulses 28 in the signal A. These overlapping characteristics can be detected by combining the signals B and C in an AND gate 99 to provide the F signal with logic characteristics B.C. The signals B and C can be introduced to a pair of inverters 95 and 97 respectively to produce the signals $\overline{B}$ and $\overline{C}$. Then the signals $\overline{B}$ and $\overline{C}$ can be combined in an AND gate 101 to provide the G signal with logic characteristics $\overline{B}.\overline{C}$.

These signals F and G, which are illustrated in FIG. 5, have pulses which occur during time intervals associated with the narrow pulses 26 and the wide pulses 28 respectively, in the signal A. As in the previous embodiment, these signals F and G can be introduced to the counter 35 to integrate the pulses in the signals F and G. As previously discussed, the pulses in the signal F cause the counter 35 to count up and the pulses in the signal G cause the counter 35 to count down. Counts above a threshold level NT can then be detected as a digital ONE or MARK and counts below the threshold level NT can be detected as a digital ZERO or SPACE.

As previously discussed it is desirable that the rate of the counter 35 be the same in response to the pulses in both the F and G signals. This can be accomplished in the present embodiment by controlling the duration of the pulses 87 and 93 in the reference signals B and C. More specifically, it can be controlled by terminating the pulses after a particular number of counts by the counter 85 and terminating the pulses 93 after a particular number of counts by the counter 91.

The particular number is primarily dependent upon the sampling frequency $f_s$ which is selected to provide a reasonable compromise between performance and implementation complexity. For example, in a preferred embodiment wherein the input FSK signal transfers data at the rate of 110 bits per second, the FSK frequencies $f_1$ and $f_2$ may be chosen to be 370 Hertz and 460 Hertz respectively. Other FSK frequencies for a particular data rate can be determined with reference to R. Lucky, J. Salz and E. Weldon, *Principles of Data Communication* (McGraw-Hill, 1968).

A convenient sampling frequency $f_s$ may be arrived at by examining the following relationships between the necessary variables:

$$n = \text{INT}\left[\frac{f_s}{B_s}\left(\frac{T_1 - T_2}{2T_1}\right)\right] \qquad \text{Eq. 1}$$

where $n$ is the maximum count of $f_s$ that will be available to the up-down counter 35 during a minimum sampling interval;

$INT$ signifies the closest integer of the argument;

$B_s$ is the maximum data or bit rate of the input FSK signal;

$T_1$ is $\frac{1}{2} f_1$; and $T_2$ is $\frac{1}{2} f_2$.

In Equation 1, the quantity $f_s/B_s$ is the number of counts of the sampling frequency $f_s$ which are available in a single baud interval. The quantity in parentheses takes into account the fact that counting is actually taking place during only a portion of the baud interval.

A convenient sampling frequency $f_s$ for this implementation may be 38.4 kilohertz. Substituting this value into Equation (1) along with the previously specified variables, it can be shown that $n = 34$. Since this is the maximum count that is available to the up-down counter 35 during the minimum sampling interval, it cannot be expected to be reliably obtainable under all channel disturbances. Therefore, it may be desirable to set the threshold of the counter 35 at a lesser value such as 16.

The particular number of counts made by the first digital counter 85 and the second digital counter 91 may vary with different embodiments of the invention. In some embodiments, the particular numbers will differ for the respective counters 85 and 91.

One particular number $m$ which may be desirable is that determined in accordance with the following formula:

$$m = \text{INT}\left(\frac{T_1 f_s}{2}\right) \qquad \text{Eq. 2}$$

This particular number can be used not only to determine the duration of the pulses 87, but also the duration of the pulses 93. In an embodiment wherein $f_1 = 370$ Hertz, $f_2 = 460$ Hertz, and $f_s = 38.4$ kilohertz, the particular number of $m$ equals 23.

In this specific embodiment, one of the pulses 87 begins in the signal B in response to each of the pulses 83 in the signal X. These pulses 87, which may have a duration corresponding to 23 counts by the counter 85, are terminated at a trailing edge 89. In response to this trailing edge 89, one of the pulses 93 begins in the signal C. In an embodiment wherein the particular number $m$ is determined in accordance with Equation 2, the pulses 93 may also have a duration corresponding to 23 counts of the sampling frequency $f_s$.

If the pulses 87 and 93 have a duration equivalent to 23 counts of the sampling frequency $f_s$, then the pulses in the first and second direction signals F and G will have durations equivalent to four and six counts respectively of the sampling frequency $f_s$.

Figure 5A:
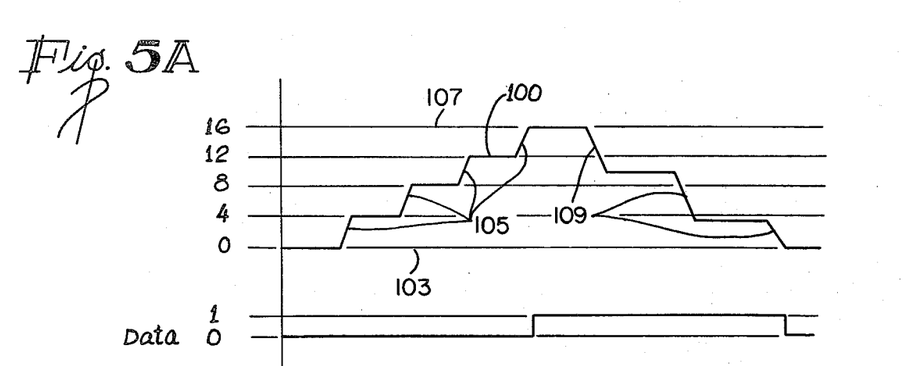
FIG. 5A is a waveform illustrating the count and the data output of a counter in the embodiment of FIG. 4.

In response to the high frequency portion 19 of the FSK signal, the pulses in the first direction signal F will be introduced to the counter 35. As shown in FIG. 5A, each of the pulses in the signal F will cause the counter 35 to count the particular number of times, such as four, until the higher saturation level, such as sixteen, is achieved. In FIG. 5A, this higher saturation level is shown by the line 107. In a signal 100 corresponding to the count of the counter 35, each of the pulses in the signal F produces a step 105 having a height dependent upon the duration of the respective pulse. When the count reaches the higher saturation level 107, the output of the counter 35 can change from a data ZERO to a data ONE to signify the detection of the high frequency FSK signal.

In response to the low frequency portion 21 of the FSK signal, the pulses in the second direction signal G will be introduced to the counter 35. From the higher saturation level, such as 16, these pulses will cause the counter 35 to count downwardly to the lower saturation level, such as zero. This lower saturation level is shown by the line 103 in FIG. 5A. Each of the pulses in the signal G produces in the signal 100 a step 109 which has a height dependent upon the duration of the pulses. When the lower saturation level 103 is achieved, the output of the counter 35 will change from a data ONE to a data ZERO to signify detection of the lower frequency FSK signal.

It will be noted that the steps 105 in the signal 100 occur at more frequent intervals than the steps 109. However the height of the steps 109 is greater than the height of the steps 105. As a result, the counter counts from the lower saturation level 103 to the upper saturation level 107 in approximately the same length of time that it counts from the upper saturation level 107 to the lower saturation level 103. Effectually this means that the demodulator is capable of detecting the high frequency portion 19 of the FSK signal in approximately the same interval of time it takes to detect the low frequency portion 21 of the FSK signal.

The FSK demodulator of the present invention yields near theoretical performance without elaborate and costly digital processing and filtering techniques. The incoming FSK signal provides information relevant to the particular FSK frequency at each of the positive going zero crossings 15 and also at each of the negative going zero crossings 17.

Specific embodiments of the invention are responsive not only to the information present at the positive going zero crossings 15 but also to the information present at the negative going zero crossing 17. As a result, each of the zero crossings 15 and 17 corresponds to a pulse in either the first direction signal F or the second direction signal G. Consequently, the counter 35 counts either up or down in response to the information present at each of the zero crossings 15 and 17. This maximizes use of the information present in the FSK signal and provides for the near theoretical performance.

The present invention includes digital binary circuitry which is applicable to MOS-LSI design. Additionally, the concept is applicable to both synchronous and nonsynchronous FSK data and data rates even higher than 110 Hertz. With two-level amplitude quantization of the input signal, this FSK demodulator can be inexpensively implemented with the use of the counter 35 to perform digital integration. Digital reference signals can be derived to provide a plurality of pulses the duration of which can be controlled to insure that the counter counts up at the same rate that it counts down. This facilitates the detection of both the higher and lower FSK frequencies in approximately the same interval of time.

Although the invention has been described with reference to specific embodiments, signals, and pulse durations, it will be apparent to those skilled in the art that the concept can be otherwise embodied. For this reason, the scope of the application should be ascertained only with reference to the following claims.

We claim:

1. A frequency shift key demodulator adapted to receive an analog signal having at least first and second frequencies, comprising:

first means responsive to the analog signal for generating a first reference signal including a plurality of first pulses;

second means responsive to at least one of the analog signal and first reference signal for generating a second reference signal including a plurality of second pulses;

each of said second pulses at least partially overlapping in time with an associated one of said first pulses when the analog signal is of said first frequency;

each of said second pulses occurring substantially completely during the interval between an associated pair of said first pulses when the analog signal is of said second frequency; and means for detecting the presence and absence of such overlapping of said first and second pulses whereby the first and second frequencies of the analog signal can be detected.

2. The frequency shift key demodulator recited in claim 1 wherein the detecting means includes:

a counter responsive to the simultaneous occurrence of the first and second pulses to count in a first direction to detect the first frequency of the analog signal and responsive to the simultaneous absence of the first and second pulses to count in a second direction to detect the second frequency of the analog signal.

3. A demodulator as defined in claim 1 wherein the analog signal is characterized by a plurality of positive going and negative going zero crossings and the first pulses of the first reference signal occur in response to the positive and negative going zero crossings, respectively, of the analog signal and each of the second pulses of the second reference signal occur a constant interval of time after an associated one of the first pulses begins.

4. A frequency shift key demodulator as defined in claim 1 wherein each of the first pulses has a trailing edge and each of said second pulses begins substantially with the trailing edge of an associated first pulse, said detecting means includes means for inverting said first reference signal and said second reference signal, a first AND gate for receiving the first reference signal and the inverted second reference signal to provide a first direction signal and a second AND gate for receiving the second reference signal and the inverted first reference signal to provide a second direction signal, and means responsive to said reference signals for detecting the first and second frequencies.

5. A frequency shift key demodulator adapted to receive an analog signal having at least first and second frequencies comprising:

first means responsive to the analog signal for providing a first direction signal which includes a plurality of first pulses defining a first pulse train which occurs in response to the first frequency whereby the first pulse train provides an indication of the first frequency;

second means responsive to the analog signal for providing a second direction signal which includes a plurality of second pulses defining a second pulse train which occurs in response to the second frequency whereby the second pulse train provides an indication of the second frequency; and counter means responsive to said first pulses for counting in a first direction to indicate said first frequency and responsive to said second pulses for counting in a second direction to indicate said second frequency.

6. A demodulator as defined in claim 5 wherein said counter means has first and second saturation levels, said counter means counting toward said first and second saturation levels in said first and second directions, respectively, and including means for providing an output signal having a characteristic which varies as the count of said counter means changes from one of said saturation levels to the other of said saturation levels.

7. A combination adapted to receive an analog signal characterized by positive and negative transitions occurring at one of a first frequency and a second frequency for detecting the presence of the first and second frequencies in the analog signal, comprising:

first means responsive to the analog signal to provide a first digital signal characterized by first pulses having a leading edge beginning with one of the positive transitions in the analog signal and a trailing edge ending with one of the negative transitions in the analog signal;

second means responsive to one of the analog signal and the first digital signal to provide a second digital signal characterized by second pulses having a leading edge and a trailing edge wherein at least alternate ones of the second pulses begin substantially simultaneously with an associated one of the first pulses and have a duration of a first particular time;

third means responsive to one of the analog signal and the first digital signal to provide a third digital signal characterized by third pulses having a leading edge beginning substantially simultaneously with the trailing edges of one of the first pulses and the second pulses, the third pulses having a duration of a second particular time;

fourth means responsive to second and third pulses to detect the first and second frequencies of the analog signal; and counter means included in the fourth means and having characteristics for counting in a first direction during the simultaneous occurrence of the second and third pulses to detect the first frequency in the analog signal and characteristics for counting in a second direction during the simultaneous absence of the second and third pulses to detect the second frequency in the analog signal.

8. The combination set forth in claim 7 wherein:

the second means begins each of the second pulses of the second signal simultaneously with the beginning of associated ones of the first pulses, and the third means begins each of the third pulses in the third signal simultaneously with the ending of associated ones of the first pulses; and the first particular time is equal to the second particular time.

9. The combination set forth in claim 7 wherein:

the second means begins some of the second pulses in the second signal simultaneously with the ending of associated ones of the first pulses, and the third means begins each of the third pulses in the third signal with the trailing edge of associated ones of the second pulses; and the first particular time is equal to the second particular time.

10. A frequency shift key demodulator adapted to receive an analog signal having at least first and second frequencies comprising:

first means responsive to the analog signal for generating a first reference signal which includes a plurality of first pulses with the intervals between said first pulses varying with the frequency of the analog signal;

second means responsive to at least one of said signals for generating a second reference signal including a plurality of second pulses with the intervals between said second pulses varying with the frequency of the analog signal;

each of said second pulses occurring for at least a portion of the interval between an associated adjacent pair of the first pulses;

third means responsive to the first and second pulses for detecting the presence or absence of the first and second frequencies in said analog signal; and each of said first pulses being of substantially the same duration, said duration being greater than one-half the duration of one cycle of the first frequency and less than one-half the duration of one cycle of the second frequency.

11. A frequency shift key demodulator adapted to receive an analog signal having at least first and second frequencies comprising:

first means responsive to the analog signal for generating a first reference signal which includes a plurality of first pulses with the intervals between said first pulses varying with the frequency of the analog signal;

second means responsive to at least one of said signals for generating a second reference signal including a plurality of second pulses with the intervals between said second pulses varying with the frequency of the analog signal;

each of said second pulses occurring for at least a portion of the interval between an associated adjacent pair of the first pulses;

third means responsive to the first and second pulses for detecting the presence or absence of the first and second frequencies in said analog signal; and each of the second pulses having a leading edge and each of the first pulses having a trailing edge, the leading edge of each of said second pulses substantially coinciding in time with the trailing edge of an associated one of said first pulses.

12. A frequency shift key demodulator adapted to receive an analog signal having at least first and second frequencies comprising:

first means responsive to the analog signal for generating a first reference signal which includes a plurality of first pulses with the intervals between said first pulses varying with the frequency of the analog signal;

second means responsive to at least one of said signals for generating a second reference signal including a plurality of second pulses with the intervals between said second pulses varying with the frequency of the analog signal;

each of said second pulses occurring for at least a portion of the interval between an associated adjacent pair of the first pulses;

third means responsive to the first and second pulses for detecting the presence or absence of the first and second frequencies in said analog signal; and the analog signal having a plurality of zero crossings and said first means being responsive to each of said zero crossings to provide one of said first pulses in response to each of said zero crossings, each of said first pulses having a traililng edge and said second means being responsive to each of said trailing edges to provide one of said second pulses in response to each of said trailing edges.

13. A frequency shift key demodulator adapted to receive an analog signal having at least first and second frequencies comprising:

first means responsive to the analog signal for generating a first reference signal which includes a plurality of first pulses with the intervals between said first pulses varying with the frequency of the analog signal;

second means responsive to at least one of said signals for generating a second reference signal including a plurality of second pulses with the intervals between said second pulses varying with the frequency of the analog signal;

each of said second pulses occurring for at least a portion of the interval between an associated adjacent pair of the first pulses;

third means responsive to the first and second pulses for detecting the presence or absence of the first and second frequencies in said analog signal; and the first pulses overlapping in time with the second pulses in response to the first frequency and not overlapping in time in response to the second frequency and said third means including means for providing a first direction signal in response to said overlapping, means for providing a second direction signal in response to the absence of said overlapping, and counter means responsive to the first direction signal to count in a first direction to indicate the first frequency and responsive to the second direction signal to count in another direction to indicate the second frequency.

14. A demodulator as defined in claim 13 wherein the analog signal has a plurality of zero crossings and said first means in responsive to each of said zero crossings to provide one of said first pulses in response to each of said zero crossings, each of said first pulses having a trailing edge and second means is responsive to each of said trailing edges to provide one of said second pulses in response to each of said trailing edges.

15. A frequency shift key demodulator adapted to receive an analog signal having at least first and second frequencies comprising:

first means responsive to the analog signal for providing a first direction signal which includes a plurality of first pulses defining a first pulse train which occurs in response to the first frequency whereby the first pulse train provides an indication of the first frequency;

second means responsive to the analog signal for providing a second direction signal which includes a plurality of second pulses defining a second pulse train which occurs in response to the second frequency whereby the second pulse train provides an indication of the second frequency;

said first pulse train being different from said second pulse train; and means responsive to said first and second pulses for indicating said first and second frequencies.

16. A frequency shift key demodulator adapted to receive an analog signal having at least first and second frequencies comprising:

first means responsive to the analog signal for generating a first reference signal which includes a plurality of first pulses with the intervals between said first pulses varying with the frequency of the analog signal;

second means responsive to at least one of said signals for generating a second reference signal including a plurality of second pulses with the intervals between said second pulses varying with the frequency of the analog signal;

each of said second pulses occurring for at least a portion of the interval between an associated adjacent pair of the first pulses;

third means responsive to the first and second pulses for detecting the presence or absence of the first and second frequencies in said analog signal;

the analog signal havig a set of positive going zero crossings and a set of negative going zero crossings, said first means being responsive to one of the sets of zero crossings to provide one of said first pulses in response to each of said zero crossings of said one set, and said second means being responsive to the other of said sets of zero crossings to provide one of said second pulses in response to each of said zero crossings of said other set; and the duration of each of said pulses being equal to half the reciprocal of the average of the first and second frequency of the analog signal.

* * * * *